(12) United States Patent
Sakai

(10) Patent No.: US 7,953,531 B2
(45) Date of Patent: May 31, 2011

(54) AUTOMATIC STEERING DEVICE FOR VEHICLE

(75) Inventor: Katsuhiro Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 930 days.

(21) Appl. No.: 11/898,473

(22) Filed: Sep. 12, 2007

(65) Prior Publication Data

US 2008/0091320 A1    Apr. 17, 2008

(30) Foreign Application Priority Data

Sep. 12, 2006   (JP) .................................. 2006-247294

(51) Int. Cl.
*B62D 6/10* (2006.01)
*G06F 19/00* (2006.01)
(52) U.S. Cl. .............................. 701/42; 701/41; 180/402
(58) Field of Classification Search .................... 701/43; 180/402, 446, 443
See application file for complete search history.

(56) References Cited

U.S. PATENT DOCUMENTS

| 7,431,117 | B2 * | 10/2008 | Ito ................................. | 180/204 |
| 2006/0037806 | A1 * | 2/2006 | Kasahara et al. ............. | 180/402 |

FOREIGN PATENT DOCUMENTS

| JP | 9-193691 A | 7/1997 |
| JP | 2002-002519 A | 1/2002 |
| JP | 2004-256076 A | 9/2004 |
| JP | 2005-162015 A | 6/2005 |

* cited by examiner

*Primary Examiner* — Tan Q Nguyen
(74) *Attorney, Agent, or Firm* — Arent Fox LLP

(57) ABSTRACT

A first correction coefficient and a second correction coefficient are map-searched based on a steering force applied by a driver to a steering wheel. A steering actuator is controlled based on an actuator driving electric current obtained by adding the product of an automatic steering control electric current and a first correction coefficient to the product of a power steering control electric current and a second correction coefficient. With an increase of the steering force, the first correction coefficient decreases and the second correction coefficient increases, so that a proportion of power steering control increases with respect to a proportion of automatic steering control.

8 Claims, 10 Drawing Sheets

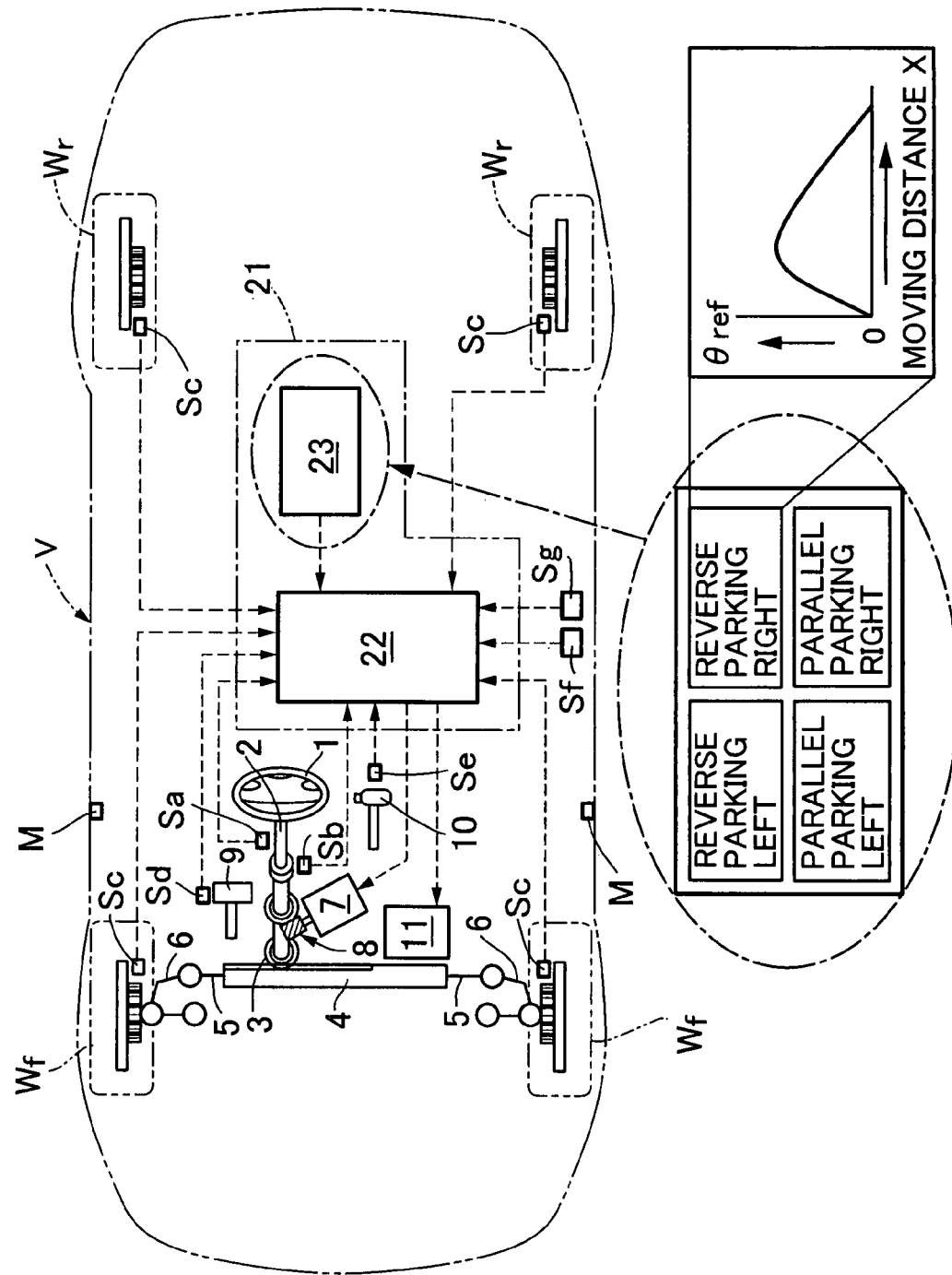

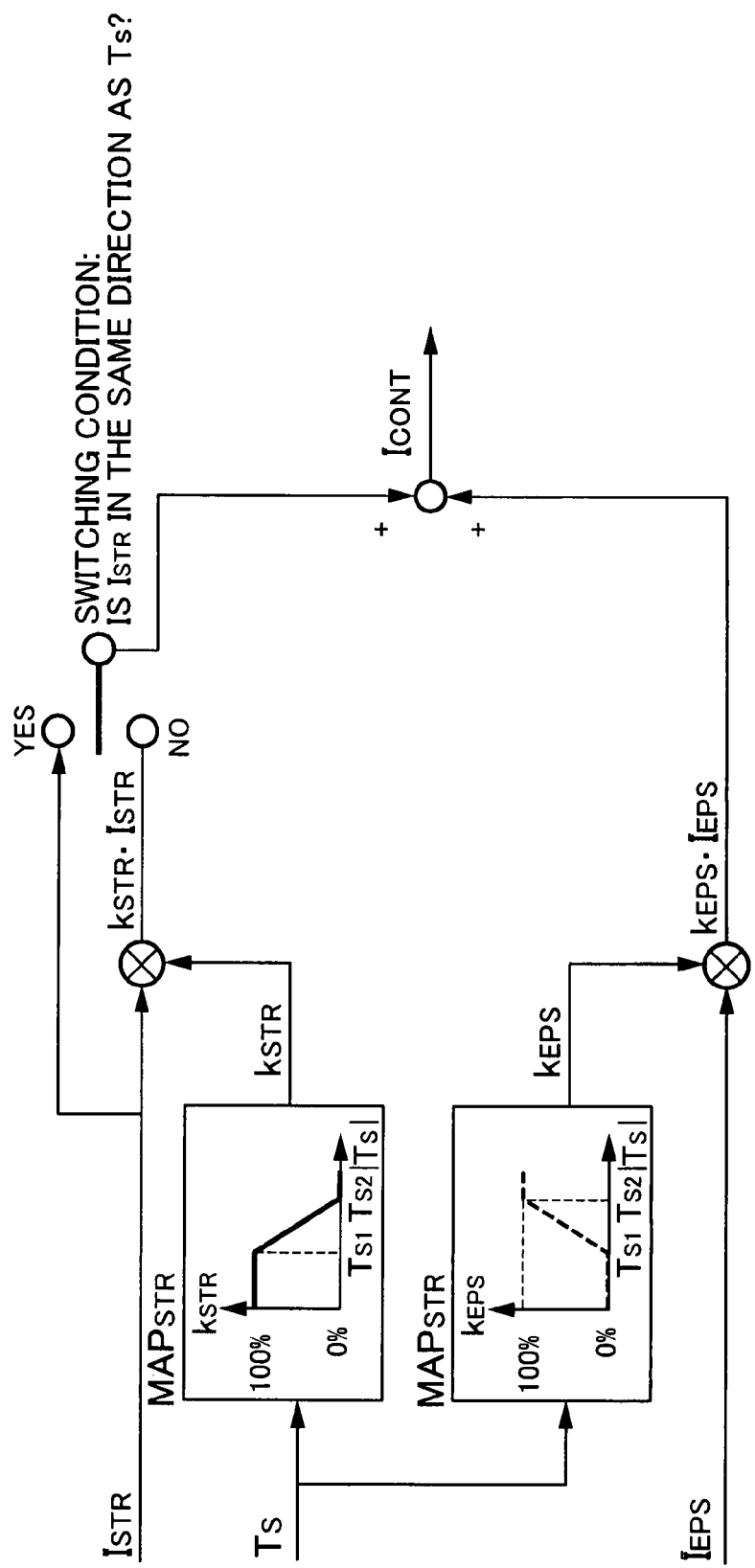

AUTOMATIC STEERING DEVICE FOR VEHICLE

CROSS-REFERENCE TO RELATED APPLICATION

The present invention claims priority under 35 USC 119 based on Japanese patent application No. 2006-247294, filed on Sep. 12, 2006. The entirety of the subject matter of this priority document is incorporated by reference herein.

BACKGROUND OF THE INVENTION

1. Field of the Invention

The present invention relates to an automatic steering device for a vehicle which minimizes the interference between an automatic steering control operation and a power steering control operation.

2. Description of the Related Art

Japanese Patent Application Laid-open No. 9-193691 (JP '691) discloses a system wherein control of an electric motor for a power steering device is switched between a normal power steering mode for assisting the driver during a steering operation and an automatic steering mode for automatic steering of a vehicle into a predetermined area, such as a garage, or in parallel parking the vehicle into a parking spot. In the automatic steering mode, the automatic steering is performed based on a relationship between a pre-stored moving distance of the vehicle and a turning angle of wheels.

In the system described in JP '691, when the driver applies a steering torque to a steering wheel during the automatic steering control, the steering torque is detected and the automatic steering control is terminated. At that time, interference between the steering operation by the driver and the automatic steering control results in a rather uncomfortable feeling to the driver. Also, when the interference terminates the instant the automatic steering control is terminated, there is yet another uncomfortable feeling sensed by the driver.

SUMMARY OF THE INVENTION

The present invention has been achieved in view of the above circumstances, and it is an aspect of the present invention to minimize the interference between the automatic steering control and the power steering control in order to eliminate an uncomfortable feeling sensed by or transmitted to a driver.

To achieve the above aspect, according to a first feature of the present invention, there is provided an automatic steering device for a vehicle, including a steering actuator for steering a wheel of the vehicle. A moving locus setting means stores or calculates a moving locus of the vehicle to a target position. A steering actuator control means calculates a first driving command value to the steering actuator, which is based on the moving locus, and calculates a second driving command value to the steering actuator which is based on a steering force applied by a driver to a steering wheel. The steering actuator control means drives the steering actuator using a control amount, which includes the first driving command value and the second driving command value in a predetermined ratio, and sets the predetermined ratio corresponding to the steering force.

With the first feature, the control amount for driving the steering actuator is calculated using a predetermined ratio of the first driving command value for automatic steering control and the second driving command value for power steering control. The predetermined ratio is set based on the steering force applied by the driver on the steering wheel, that is, an intention of the driver. Therefore, it is possible to solve the problem of the automatic steering control interfering with the power steering control and resulting in an uncomfortable feeling sensed by or transmitted to the driver.

According to a second feature of the present invention, in addition to the first feature, the steering actuator control means sets the predetermined ratio such that a proportion of the first driving command value is reduced as the steering force increases.

With the second feature, when the steering force applied by the driver to the steering wheel increases, the proportion of the first driving command value for the automatic steering control is decreased in the control amounts for driving the steering actuator, and thus, the voluntary steering operation by the driver becomes less hindered by the automatic steering control. Therefore, it is possible to eliminate the uncomfortable feeling sensed by or transmitted to the driver.

According to a third feature of the present invention, in addition to the second feature, the steering actuator control means maintains the proportion of the first driving command value when a direction of the steering force is the same as a direction of the first driving command value.

With the third feature, when the direction of the steering force applied by the driver to the steering wheel is the same as the direction of the first driving command value for the automatic steering control, the first driving command value is maintained rather than reduced. Therefore, it is possible to smoothen the driver's steering operation and eliminate any uncomfortable feeling being sensed by or transmitted to the driver.

According to a fourth feature of the present invention, in addition to the first feature, the steering actuator control means sets the predetermined ratio such that the second driving command value is increased as the steering force increases.

With the fourth feature, when the steering force applied by the driver to the steering wheel increases, the proportion of the second driving command value for the power steering control is increased in the control amount for driving the steering actuator. Thus, priority is given to the voluntary steering operation by the driver over the automatic steering control. Therefore, it is possible to eliminate the uncomfortable feeling being sensed by or transmitted to the driver.

According to a fifth feature of the present invention, in addition to any of the first-to-fourth features, when termination of the automatic steering control is confirmed, the steering actuator control means sets the predetermined ratio as an initial value at the time of confirmation, decreases the proportion of the first driving command value, and increases the proportion of the second driving command value according to an elapsed time from the time termination of the automatic steering control is confirmed.

With the fifth feature, when termination of the automatic steering control is confirmed, the predetermined ratio is established as the initial value at the time of confirmation, the proportion of the first driving command value is decreased, and the proportion of the second driving command value is increased according to the elapsed time from the time termination of the automatic steering control is confirmed. Therefore, it is possible to smoothly shift the automatic steering control to the power steering control and eliminate the driver sensing or receiving an uncomfortable feeling.

A steering actuator control section in the below-described embodiments corresponds to the steering actuator control means of the invention. A memory section in the below-described embodiments corresponds to the moving locus setting means of the invention. An automatic steering control electric current in the below-described embodiments corresponds to the first driving command value of the invention. A power steering control electric current in the below-described embodiments corresponds to the second driving command value of the invention. An actuator driving electric current in the below-described embodiments corresponds to the control amount of the invention. A steering torque in the below-described embodiments corresponds to the steering force of the invention, and front wheels in the below-described embodiments correspond to the wheel of the invention.

The above-mentioned aspect, other aspects, characteristics, and advantages of the present invention will become apparent from preferred embodiments of the present invention which will be described in detail below by reference to the attached drawings.

BRIEF DESCRIPTION OF THE DRAWINGS

FIG. 1 is a schematic diagram showing a vehicle including an automatic steering device according to a first embodiment of the present invention;

FIG. 10 is a diagram explaining a method of calculating an actuator driving electric current according to a second embodiment of the present invention.

DESCRIPTION OF PREFERRED EMBODIMENTS

Figure 2A:
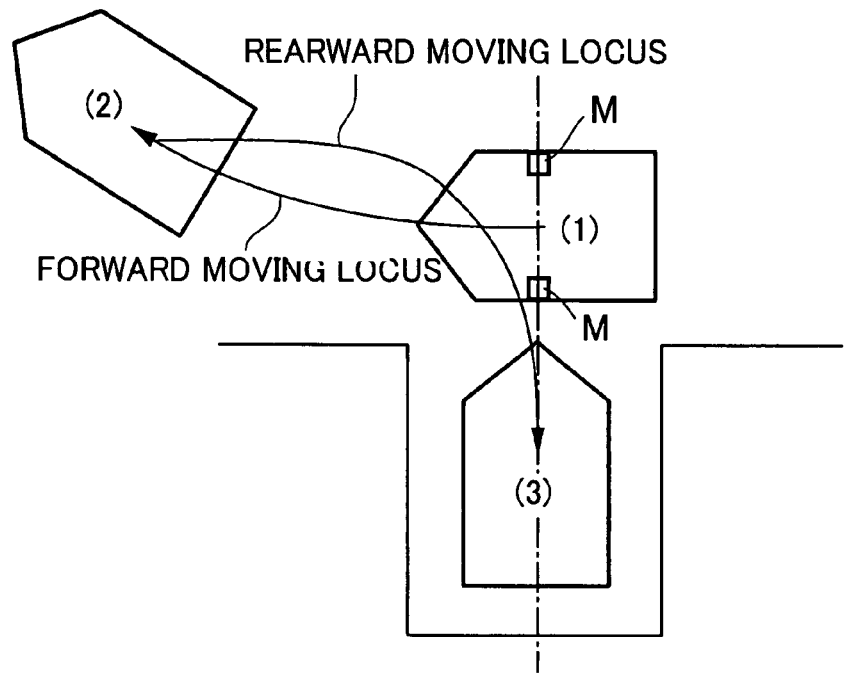
FIG. 2A is a diagram explaining operation of reverse parking/left mode.

As shown in FIG. 1, a vehicle V includes a pair of front wheels Wf, Wf and a pair of rear wheels Wr, Wr. A steering wheel 1 and the front wheels Wf, Wf, which are steered wheels, are connected to each other via a steering shaft 2 integrally rotating with the steering wheel 1, a pinion 3 provided at a lower end of the steering shaft 2, a rack 4 meshed with the pinion 3, right and left tie rods 5, 5 provided at opposite ends of the rack 4, and right and left knuckles 6, 6 connected to the tie rods 5, 5. In order to assist the operation of the steering wheel 1 by a driver or in order to perform automatic steering in putting a vehicle into a garage, which will be described later, a steering actuator 7 having an electric motor is connected to the steering shaft 2 via a warm gear mechanism 8.

The steering control device 21 includes a control section 22 and a memory section 23. Signals are input to the control section 22 from a steering angle detecting means Sa for detecting a steering angle θ which is a rotation angle of the steering wheel 1; a steering torque detecting means Sb for detecting a steering torque Ts of the steering wheel 1; a wheel rotation angle detecting means Sc for detecting a rotation angle of the wheels Wf, Wf; Wr, Wr; a brake operation amount detecting means Sd for detecting an operation amount of a brake pedal 9; and a shift-range detecting means Se for detecting shift ranges ("D" range, "R" range, "N" range, "P" range and other ranges) selected by a select lever 10.

Figure 3:
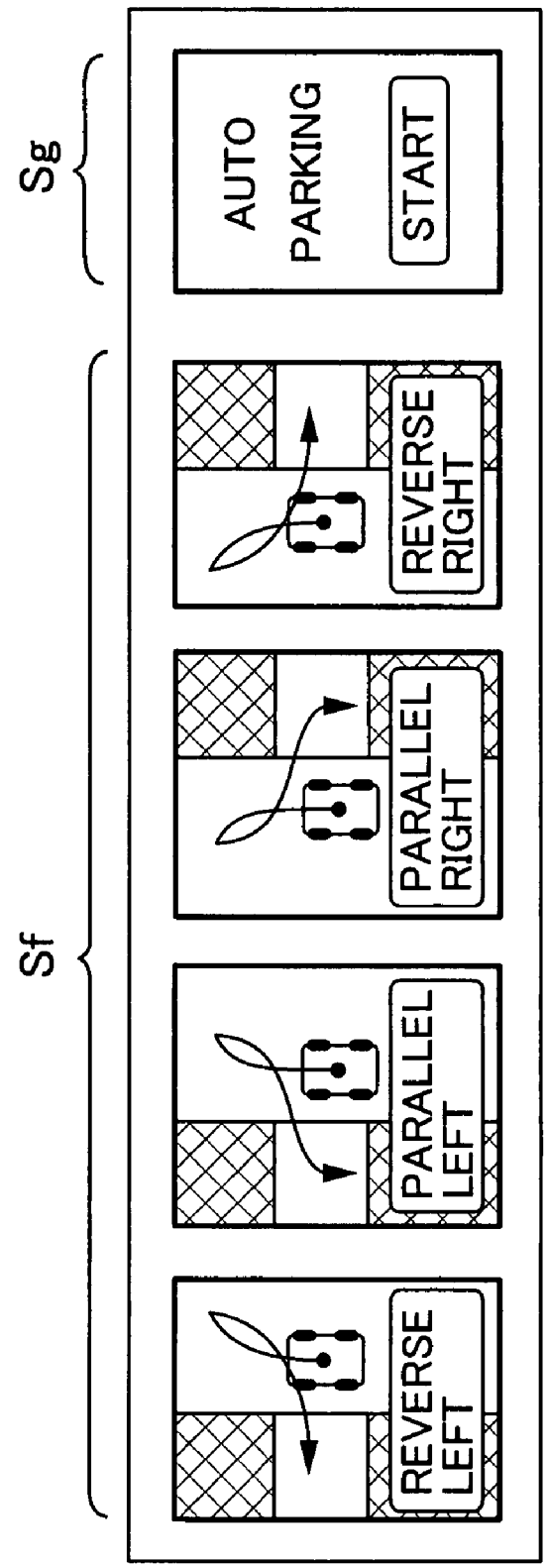
FIG. 3 is a diagram showing a mode selection switch and an automatic parking start switch.

As shown in FIG. 3, a mode selection switch Sf and an automatic parking start switch Sg, both of which are operated by a driver, are connected to the control section 22. The mode selection switch Sf includes four buttons, which are selectively operated to select any of four types of parking modes, namely, a reverse parking/right mode, a reverse parking/left mode, a parallel parking/right mode, and a parallel parking/left mode which will be described later. The automatic parking start switch Sg is operated to start whichever one of the above-described modes is selected by the mode selection switch Sf.

Figure 2B:
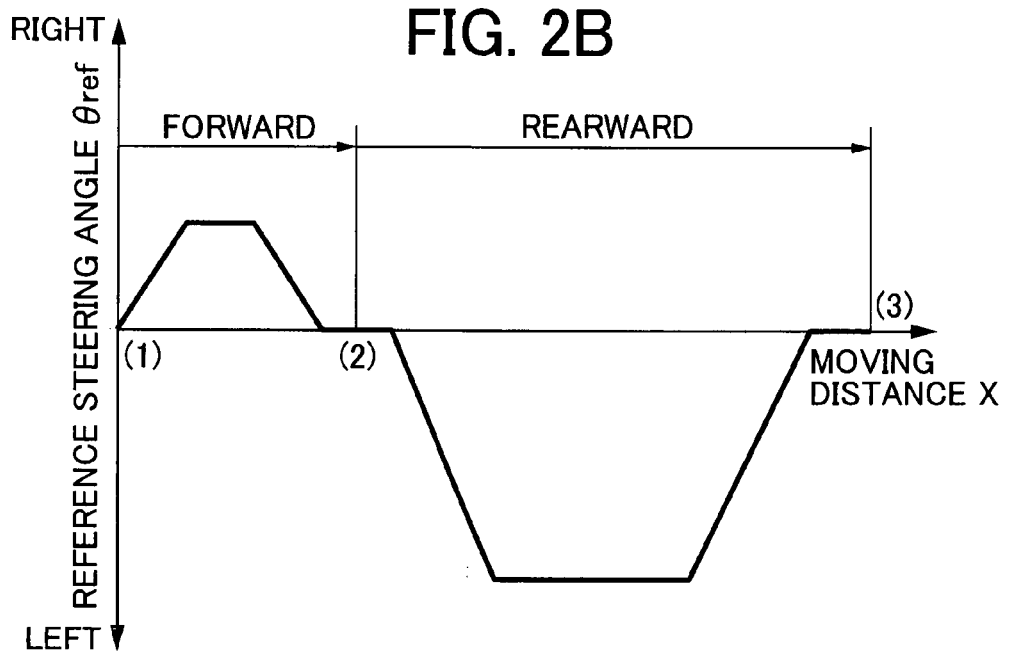
FIG. 2B is a graph explaining the operation of the reverse parking/left mode.

The memory section 23 pre-stores data, in the form of a map, about the above-described parking modes, namely, a relationship between a reference steering angle θref and a moving distance X of the vehicle V (see FIG. 2B). The moving distance X of the vehicle V is obtained by multiplying the known circumferential lengths of the wheels Wf, Wf; Wr, Wr by the rotation angles of the wheels Wf, Wf; Wr, Wr detected by the wheel rotation angle detecting means Sc. The calculation of the moving distance X uses a high select value, a low select value, or an average value of the wheel rotation angle output by the wheel rotation angle detecting means Sc.

The control section 22 controls the operation of the steering actuator 7 as well as operation of an operation stage teaching device 11, which includes a liquid crystal monitor, a speaker, a lamp, a chime, a buzzer and other components, based on signals from the detecting means Sa to Se, the switches Sf and Sg and the data of the parking modes stored in the memory section 23.

Next, operation of the first embodiment of the present invention having the above-described structural configuration and components will be described.

In a normal operation where automatic parking is not performed (where the mode selection switch Sf is not operated), the steering control device 21 is in the power steering mode and functions as a general power steering control device. Specifically, when the steering wheel 1 is operated by a driver in order to turn the vehicle V, the steering torque detecting means Sb detects the steering torque Ts input to the steering wheel 1, and the control section 22 controls the driving of the steering actuator 7 based on the steering torque Ts. As a result, the driving force of the steering actuator 7 turns the right and left front wheels Wf, Wf while assisting the steering operation of the driver.

Next, details of the automatic steering control will be described with reference to the reverse parking/left mode (parking mode where the vehicle V is controlled to travel rearward to a parking position on the left side of the vehicle V). It should be noted that during the period from start to termination of the automatic steering control, the driver does not operate the steering wheel 1.

First, as shown in FIG. 2A, the driver moves the vehicle V by his own steering operation to the vicinity of a garage where the vehicle V is to be parked such that the left side of the vehicle V comes as close as possible to the garage entrance line. The driver then stops the vehicle V at a position (start position (1)) where marks M (see FIG. 1) provided on the inside of the vehicle doors are aligned with the center line of the garage. Then, when the driver operates the mode selection switch Sf to select the reverse parking/left mode and turns on the automatic parking start switch Sg, the power steering mode is shifted to the automatic steering mode and the automatic steering control is started. During automatic steering control, the operation stage teaching device 11 displays a current position of the vehicle, any obstacles near the vehicle, a parking position, a target movement locus of the vehicle from the start position (1) to a target position (3), a turning-back position (2) to switch from forward traveling to rearward traveling, and the like. The operation stage teaching device also provides various alarms and instructions to the driver, such as vocal instructions from a speaker about the operation of the select lever 10 at the turning-back position (2).

It should be noted that door mirrors may be used instead of the marks M provided on the inside of the doors. Also, the marks M or the door mirrors may be aligned with an end of the garage instead of being aligned with the center line of the garage.

In the automatic steering control, when the driver merely lifts his foot off the brake pedal 9 to cause the vehicle V to creep slightly forward, the front wheels Wf, Wf are automatically turned without operation of the steering wheel 1, based on the data of reverse parking/left mode selected by the mode selection switch Sf. Specifically, the front wheels Wf, Wf are automatically turned to the right while the vehicle V travels forward from the start position (1) to the turning-back position (2), and the front wheels Wf, Wf are automatically turned to the left while the vehicle V travels rearward from the turning-back position (2) to the target position (3).

As shown in FIG. 2B, during the automatic steering control, the control section 22 calculates a deviation E (=θref−θ) using a reverse parking/left mode reference steering angle θref retrieved from the memory section 23 and the steering angle θ input from the steering angle detecting means Sa, and then controls the operation of the steering actuator 7 so that the deviation E becomes 0. Because the data of the reference steering angle θref is set corresponding to the moving distance X of the vehicle V, the vehicle V always moves on the moving locus even if the creeping speed of the vehicle V fluctuates.

The automatic steering control is terminated when the driver turns off the mode selection switch Sf. Also, the control is terminated and returned to the normal power steering control when the driver returns the select lever 10 to the "P" range, when the driver lifts his foot off the brake pedal 9, when the car speed becomes a predetermined value or more, and when the driver applies the steering torque Ts of a predetermined value or more to the steering wheel 1.

The control of the steering actuator 7, when the driver applies the steering torque Ts to the steering wheel 1 during the automatic steering control, will be described below.

Figure 4:
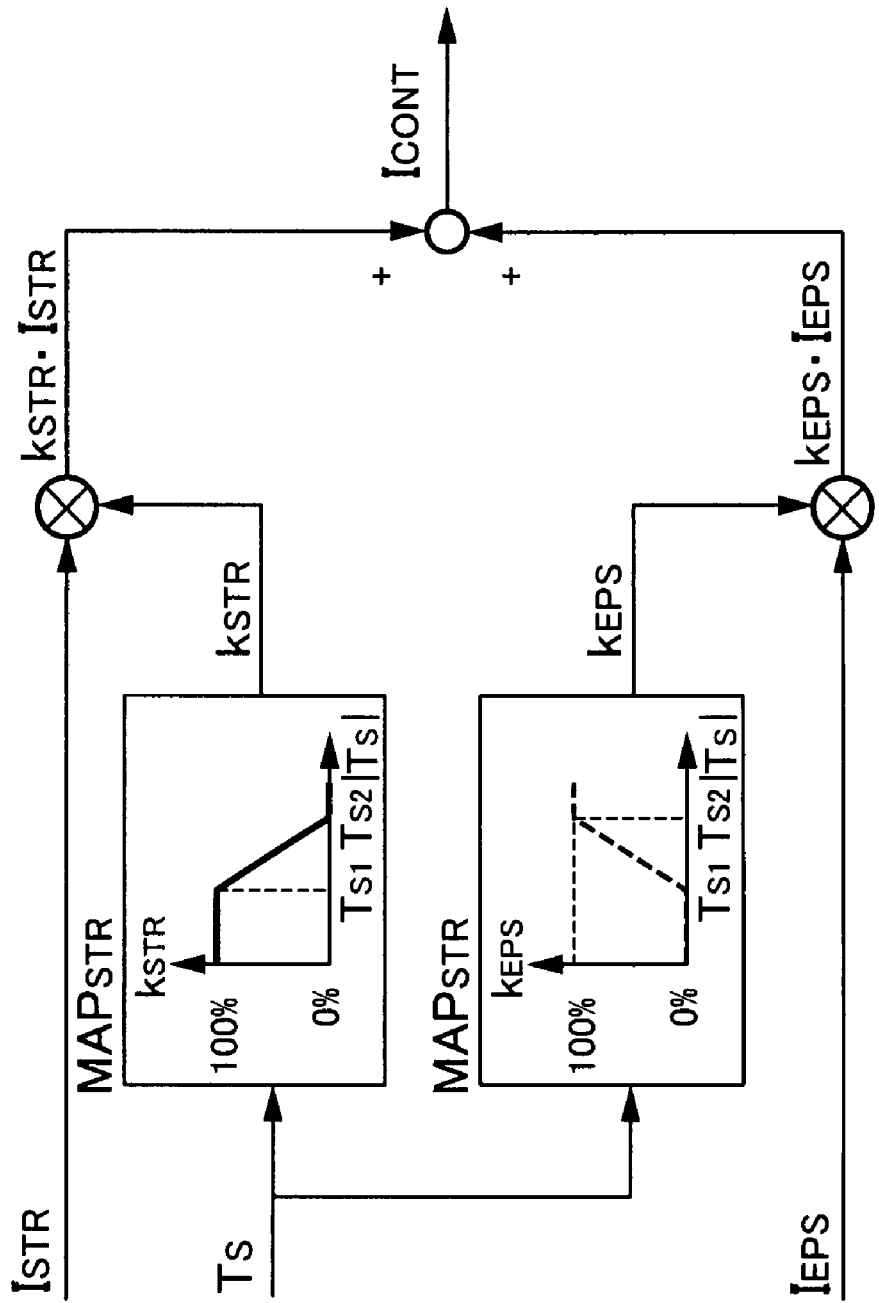
FIG. 4 is a method of calculating an actuator driving electric current.

As shown in FIG. 4, the actuator driving electric current $I_{CONT}$ for driving the steering actuator 7 is obtained by adding the automatic steering control electric current $I_{STR}$ and the power steering control electric current $I_{EPS}$. However, before the two currents $I_{STR}$ and $I_{EPS}$ are added together, the automatic steering control electric current $I_{STR}$ and the power steering control electric current $I_{EPS}$ are each corrected by the steering torque Ts detected by the steering torque detecting means Sb. The automatic steering control electric current $I_{STR}$ is an electric current required for obtaining the reference steering angle θref of the automatic steering control. The power steering control electric current $I_{EPS}$ is an electric current required for assisting the steering operation by the driver. Both currents $I_{STR}$ and $I_{EPS}$ are calculated in the steering control device 21.

A first correction coefficient search map $MAP_{STR}$ for searching a first correction coefficient $k_{STR}$ with the steering torque Ts as a parameter and a second correction coefficient search map $MAP_{EPS}$ for searching a second correction coefficient $k_{EPS}$ with the steering torque Ts as a parameter are each previously stored in the steering control device 21. The sum of (1) a corrected automatic steering control electric current $k_{STR} \cdot I_{STR}$ obtained by multiplying the first correction coefficient $k_{STR}$ retrieved from the first correction coefficient search map $MAP_{STR}$ by the automatic steering control electric current $I_{STR}$ and (2) a corrected power steering control electric current $k_{EPS} \cdot I_{EPS}$ obtained by multiplying the second correction coefficient $k_{EPS}$ retrieved from the second correction coefficient search map $MAP_{EPS}$ by the power steering control electric current $I_{EPS}$, is outputted as the automatic steering control electric current $I_{STR}$.

$$I_{CONT} = k_{STR} \cdot I_{STR} + k_{EPS} \cdot I_{EPS}$$

A first threshold value $T_{S1}$ and a second threshold value $T_{S2}$ are set for an absolute value of the steering torque Ts which is a parameter of the first correction coefficient search map $MAP_{STR}$ and the second correction coefficient search map $MAP_{EPS}$. In the first correction coefficient search map $MAP_{STR}$, the first correction coefficient $k_{STR}$ is 100% in a region where the absolute value of the steering torque Ts is less than the first threshold value $T_{S1}$, linearly decreases from 100% to 0% in a region not less than the first threshold value $T_{S1}$ and less than the second threshold value $T_{S2}$, and is fixed at 0% in a region not less than the second threshold value $T_{S2}$. On the other hand, in the second correction coefficient search map $MAP_{EPS}$, the first correction coefficient $k_{STR}$ is 0% in a region where the absolute value of the steering torque Ts is less than the first threshold value $T_{S1}$, linearly increases from 0% to 100% in a region not less than the first threshold value $T_{S1}$ and less than the second threshold value $T_{S2}$, and is fixed at 100% in a region not less than the second threshold value $T_{S2}$.

Therefore, even when the driver operates the steering wheel 1 during automatic steering control, if the absolute value of the steering torque Ts is less than the first threshold value $T_{S1}$, the corrected power steering control electric current $k_{EPS} \cdot I_{EPS}$ becomes 0, the corrected automatic steering control electric current $k_{STR} \cdot I_{STR}$ becomes the automatic steering control electric current $I_{STR}$ itself, and genuine automatic steering control is performed rather than power steering control. With this arrangement, even in a case where the driver erroneously touches the steering wheel 1 during the automatic steering control, the automatic steering control is prevented from being affected by the driver's erroneous operation.

Also, when the absolute value of the steering torque Ts applied by the driver to the steering wheel 1 becomes equal to or greater than the second threshold value $T_{S2}$, the corrected power steering control electric current $k_{EPS} \cdot I_{EPS}$ becomes the power steering control electric current $I_{EPS}$ itself, the corrected automatic steering control electric current $k_{STR} \cdot I_{STR}$ becomes 0, and the automatic steering control is forcedly terminated and returned to the power steering control. With this arrangement, even in a case where the driver encounters an obstacle during the automatic steering control and forcefully operates the steering wheel 1, the power steering control easily avoids the obstacle.

Also, when the absolute value of the steering torque Ts applied by the driver to the steering wheel 1 is in a region not less than the first threshold value $T_{S1}$ and less than the second threshold value $T_{S2}$, the proportion of the power steering control is increased and the proportion of the automatic steering control is decreased according to an increase of the absolute value of the steering torque Ts. Therefore, it is possible to prevent interference between the power steering control and the automatic steering control, thereby eliminating an uncomfortable feeling being sensed by or transmitted to the driver.

The magnitude of the second threshold value $T_{S2}$ to forcefully terminate the automatic steering control is set to be smaller than the magnitude of the steering torque Ts applied by the driver to the steering wheel 1 during the normal power steering control. With this arrangement, when the driver operates the steering wheel 1 during automatic steering control so that the automatic steering control is forcefully terminated and shifted to the power steering control, the power steering control enables the steering actuator 7 to generate an assist torque equal to or greater than the second threshold value $T_{S2}$. Therefore, it is possible to prevent a situation where the steering wheel 1 suddenly becomes heavy when switching the control, thereby eliminating an uncomfortable feeling being sensed by or transmitted to the driver.

As shown in FIGS. 5 to 7, various distribution ratios between the automatic steering control and the power steering control are conceivable in the region not less than the first threshold value $T_{S1}$ and less than the second threshold value $T_{S2}$.

Figure 5A:
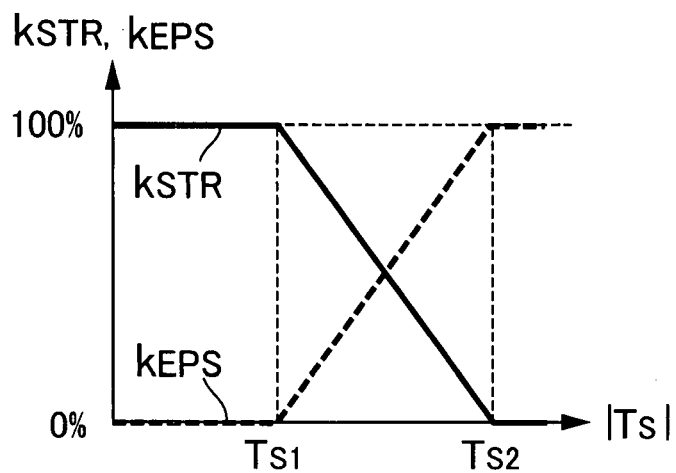
FIGS. 5A to 5C are graphs showing first-to-third setting examples of first and second correction coefficient search maps.

An example shown in FIG. 5A is a basic example as in the case of the example shown in FIG. 4.

Figure 5B:
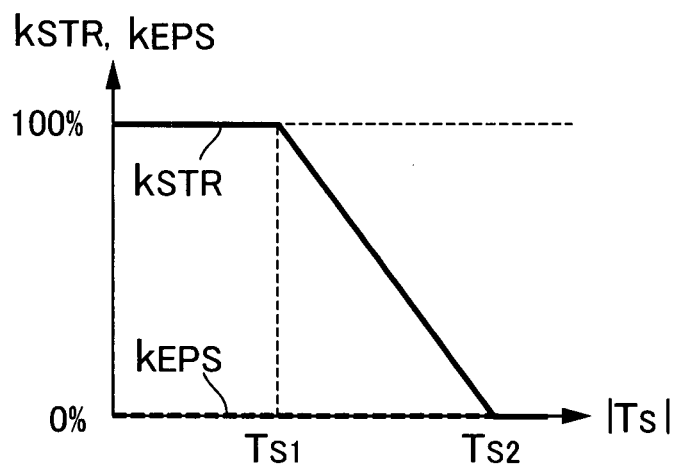

In an example shown in FIG. 5B, in the region not less than the first threshold value $T_{S1}$ and less than the second threshold value $T_{S2}$, the first correction coefficient $k_{STR}$ of the automatic steering control gradually decreases from 100% to 0%, and the second correction coefficient $k_{EPS}$ of the power steering control is maintained at 0%. Thus, the gradual decrease in the proportion of the automatic steering control prevents the automatic steering control from interfering with the steering operation by the driver.

Figure 5C:
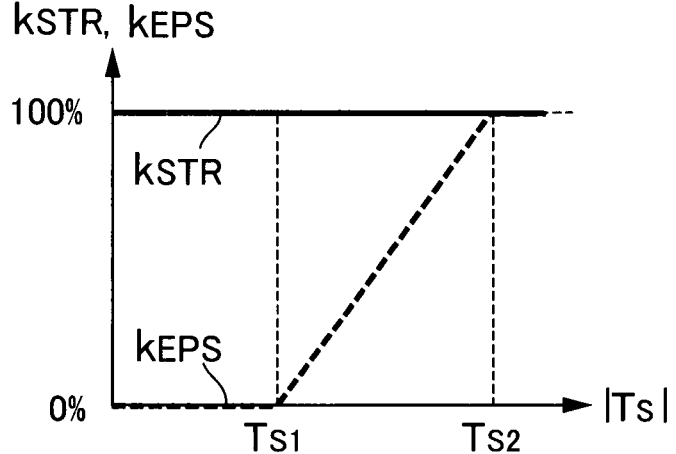

In an example shown in FIG. 5C, in the region not less than the first threshold value $T_{S1}$ and less than the second threshold value $T_{S2}$, the first correction coefficient $k_{STR}$ of the automatic steering control is maintained at 100%, and the second correction coefficient $k_{EPS}$ of the power steering control increases from 0% to 100%. Thus, the steering operation by the driver is sufficiently assisted.

Figure 6A:
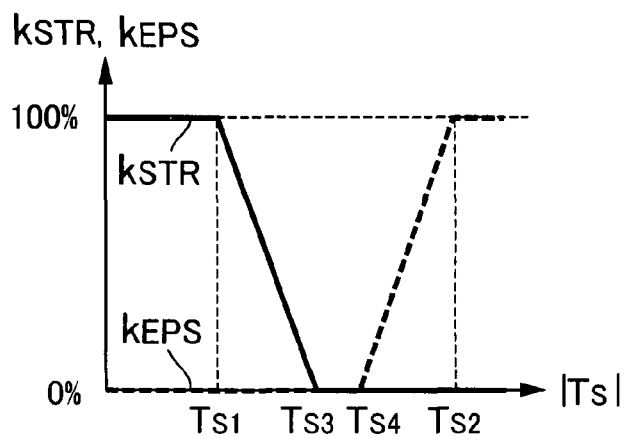
FIGS. 6A to 6C are graphs showing fourth-to-sixth setting examples of the first and second correction coefficient search maps.

In an example shown in FIG. 6A, when the absolute value of the steering torque Ts becomes the first threshold value $T_{S1}$ or more, the first correction coefficient $k_{STR}$ of the automatic steering control decreases from 100% to 0% at a third threshold value $T_{S3}$ smaller than the second threshold value $T_{S2}$, thereby preventing the automatic steering control from interfering with the power steering control. Nevertheless, if the absolute value of the steering torque Ts further increases, the second correction coefficient $k_{EPS}$ of the power steering control is increased from 0% at a fourth threshold value $T_{S4}$, which is larger than the third threshold value $T_{S3}$, to 100% at the second threshold value $T_{S2}$, thereby sufficiently assisting the steering operation of the driver.

Figure 6B:
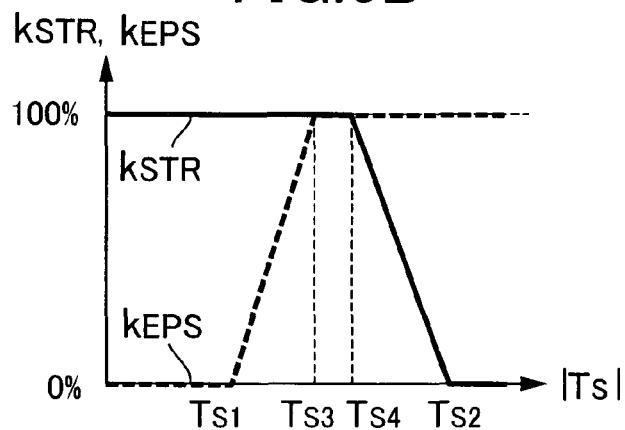

In an example shown in FIG. 6B, when the absolute value of the steering torque Ts becomes the first threshold value $T_{S1}$ or more, the second correction coefficient $k_{EPS}$ of the power steering control increases from 0% to 100% at the third threshold value $T_{S3}$, which is smaller than the second threshold value $T_{S2}$, thereby sufficiently assisting the steering operation of the driver. Nevertheless, if the absolute value of the steering torque Ts further increases, the first correction coefficient $k_{STR}$ of the automatic steering control decreases from 100% at the fourth threshold value $T_{S4}$, which is larger than the third threshold value $T_{S3}$, to 0% at the second threshold value $T_{S2}$, thereby preventing the automatic steering control from interfering with the steering operation.

Figure 6C:
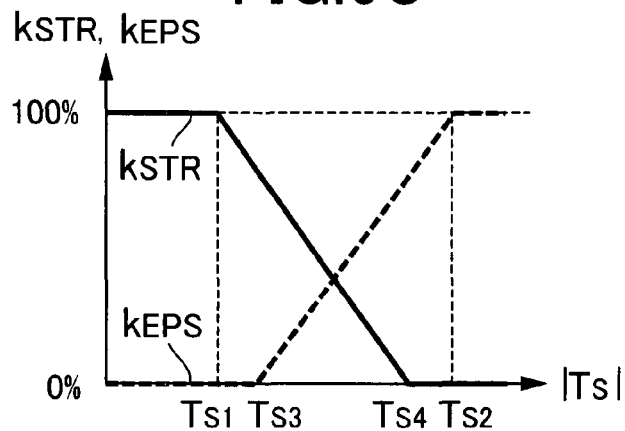

In an example shown in FIG. 6C, the third threshold value $T_{S3}$, where the second correction coefficient $k_{EPS}$ of the power steering control starts to increase from 0%, and the fourth threshold value $T_{S4}$, where the first correction coefficient $k_{STR}$ of the automatic steering control decreases to 0%, are set in the middle between the examples shown in FIGS. 5A and 6A.

Figure 7A:
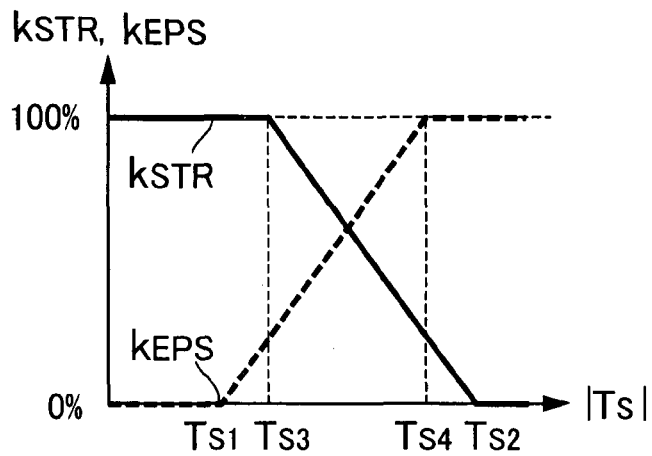
FIGS. 7A to 7C are graphs showing seventh-to-ninth setting examples of the first and second correction coefficient search maps.

In an example shown in FIG. 7A, the third threshold value $T_{S3}$, where the first correction coefficient $k_{STR}$ of the automatic steering control starts to decrease from 100%, and the fourth threshold value $T_{S4}$, where the second correction coefficient $k_{EPS}$ of the power steering control increases to 100%, are set in the middle between the examples shown in FIGS. 5A and 6B.

Figure 7B:
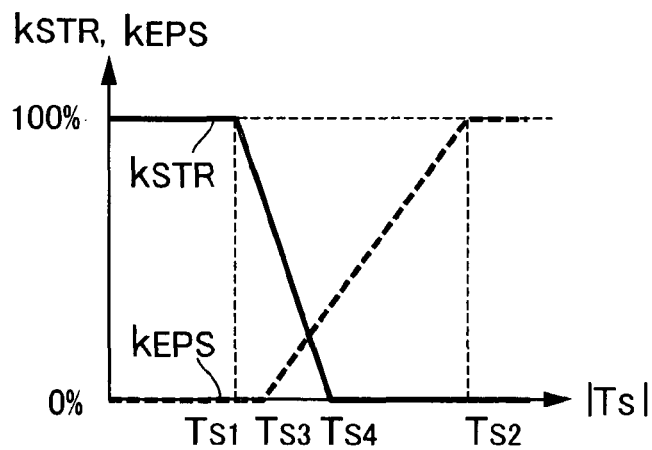

In an example shown in FIG. 7B, the fourth threshold value $T_{S4}$, where the first correction coefficient $k_{STR}$ of the automatic steering control decreases to 0%, is set smaller compared to the example in FIG. 6C.

Figure 7C:
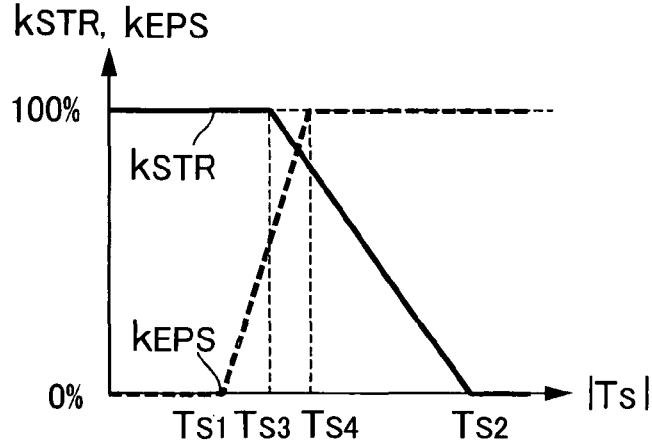

In an example shown in FIG. 7C, the fourth threshold value $TS_4$, where the second correction coefficient $k_{EPS}$ of the power steering control increases to 100%, is set smaller compared to the example in FIG. 7A.

As described above, by changing the setting of the first correction coefficient search map $MAP_{STR}$ and the second correction coefficient search map $MAP_{EPS}$ for searching the first correction coefficient $k_{STR}$ and the second correction coefficient $k_{EPS}$, the ratio between the automatic steering control and the power steering control is arbitrarily changed even if the driver applies the steering torque Ts to the steering wheel 1 during the automatic steering control, thereby eliminating an uncomfortable feeling being sensed by or transmitted to the driver while maintaining the function of the automatic steering control.

Next, based on FIGS. 8A-8C and 9A-9C, a method of calculating the actuator driving electric current $I_{CONT}$ in a transition period, where the termination of the automatic steering control is confirmed and the control is shifted to the power steering control, will be described.

When the automatic steering control is terminated and switched to the power steering control, if the actuator driving electric current $I_{CONT}$ is switched from the automatic steering control electric current $I_{STR}$ to the power steering control electric current $I_{EPS}$, the steering wheel 1 can suddenly be stopped. Also, if the driver applies the steering torque Ts to the steering wheel 1 to terminate the automatic steering control, the steering torque Ts, generated by the steering actuator 7, is rapidly changed which causes an uncomfortable feeling being sensed by or transmitted to the driver.

Thus, a first time coefficient $T_{STR}$ ($0\% \leq \eta_{STR} \leq 100\%$) and a second time coefficient $\eta_{EPS}$ ($0\% \leq \eta_{EPS} \leq 100\%$), which are functions of time t, are established, and the actuator driving electric current $I_{CONT}$ is corrected using the first time coefficient $\eta_{STR}$ and the second time coefficient $\eta_{EPS}$ during the transition period from the confirmation of termination of the automatic steering control to the start of the power steering control.

$$I_{CONT} = \eta_{STR} I_{STR} + \eta_{EPS} I_{EPS}$$

where the first time coefficient $\eta_{STR}$ is:
when $t=t0$: $\eta_{STR}=k_{STRE}$
when $t0 \leq t \leq t1s$: $\eta_{STR}=k_{STRE} \cdot \alpha(t-t0)$
when $t1s \leq t$: $\eta_{STR}=0\%$ where the second time coefficient $\eta_{EPS}$ is:
when t=t0: $\eta_{EPS}=k_{EPSE}$
when t0<t<t1e: $\eta_{EPS}=k_{EPSE}\cdot\alpha(t-t0)$
when t1e≦t: $\eta_{EPS}=0\%$.

Also, t0 is a time when termination of the automatic steering control is confirmed, t1s is a time when the first time coefficient $\eta_{STR}$ reaches 0%, and t1e is a time when the second time coefficient $\eta_{EPS}$ reaches 100%. Moreover, $k_{STRE}$ is the first correction coefficient $k_{STR}$ at the time t0, $k_{EPSE}$ is the second correction coefficient $k_{EPS}$ at the time t0, and α is a change rate of the first time coefficient $\eta_{STR}$ and the second time coefficient $\eta_{EPS}$ with respect to the time t.

Figure 8A:
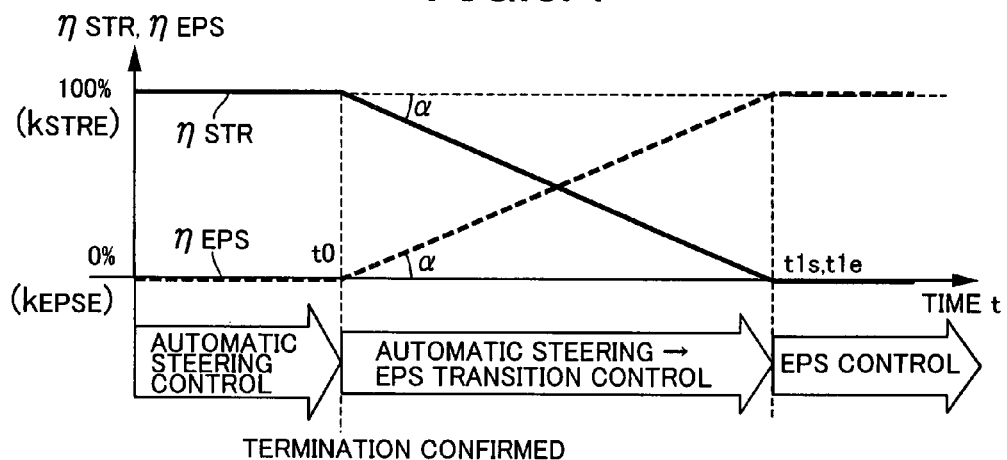
FIGS. 8A to 8C are graphs explaining a first part of an operation shifting from automatic steering control to power steering control.
Figure 8B:
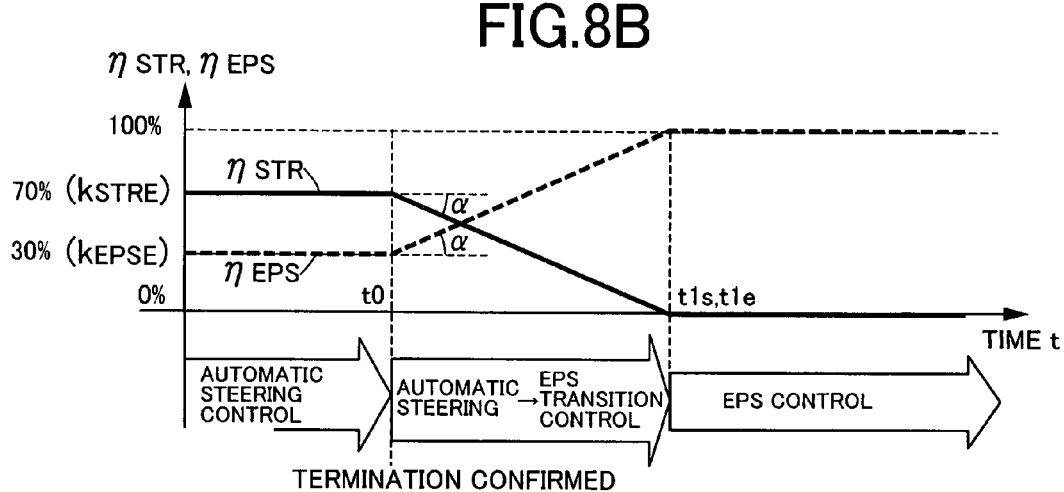
Figure 8C:
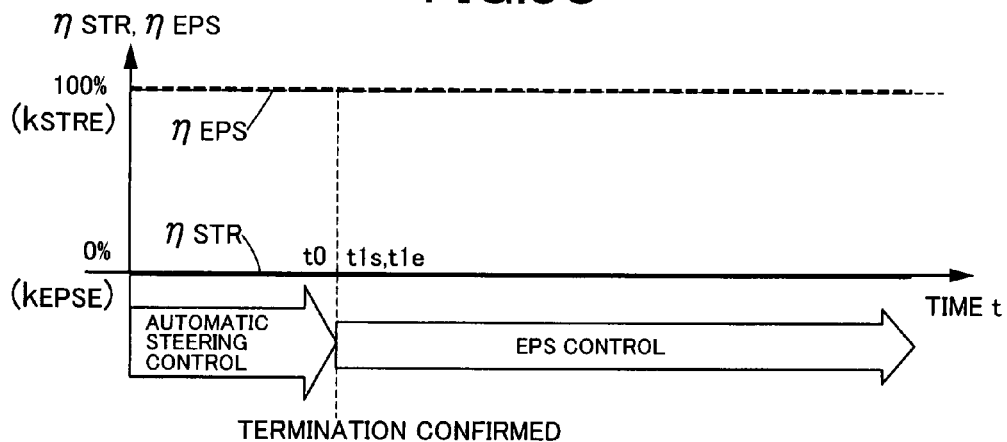

Time charts in FIGS. 8A-8C show changes of the first correction coefficient $k_{STR}$ and the second correction coefficient $k_{EPS}$ based on the map in FIG. 5A at the time of the switching transition period.

An example in FIG. 8A shows the case of the steering torque Ts being less than the first threshold value $T_{S1}$ at the time t=t0 when termination of the automatic steering control is confirmed. At t=t0, the first time coefficient $\eta_{STR}$ is 100% and the second time coefficient $\eta_{EPS}$ is 0% (see FIG. 5A). After that, the first time coefficient $\eta_{STR}$ decreases from 100% and becomes 0% at the time t1s when the power steering control is started. On the other hand, the second time coefficient $\eta_{EPS}$ increases from 0% and becomes 100% at the time t1e (=t1s) when the power steering control is started.

As described above, the first correction coefficient $k_{STR}$ is gradually decreased and the second correction coefficient $k_{EPS}$ is gradually increased in the switching transition period from confirming termination of the automatic steering control to starting the power steering control. Therefore, it is possible to prevent a rapid change of the steering torque Ts generated by the steering actuator 7, thereby eliminating an uncomfortable feeling being sensed by the driver.

An example in FIG. 8B is the case of $T_{S1}$ being less than or equal to Ts which itself is less than $T_{S2}$ at the time t=t0 when termination of the automatic steering control is confirmed. At t=t0, the first time coefficient $\eta_{STR}$ at t=t0 is 70% and the second time coefficient $\eta_{EPS}$ is 30% (see FIG. 5A). After that, the first time coefficient $\eta_{STR}$ is decreased from 70% and becomes 0% at the time t1s when the power steering control is started. On the other hand, the second time coefficient $\eta_{EPS}$ is increased from 30% and becomes 100% at the time t1e (=t1s) when the power steering control is started. In this case, because the change rates α of the first time coefficient $\eta_{STR}$ and the second time coefficient $\eta_{EPS}$ are the same as in the case of FIG. 8A, the switching transition period becomes shorter than that in the case of FIG. 8A.

An example in FIG. 8C is the case of $T_{S2}$ being equal to or less than Ts at the time t=t0 when termination of the automatic steering control is confirmed. At t=t0, the first time coefficient $\eta_{STR}$ is 0% and the second time coefficient $\eta_{EPS}$ is 100% (see FIG. 5A). In this case, the first time coefficient $k_{STR}$ and the second time coefficient $k_{EPS}$ are not changed even if the automatic steering control is shifted to the power steering control. Therefore, the switching transition period is not required, and thus, the automatic steering control is immediately shifted to the power steering control.

Figure 9A:
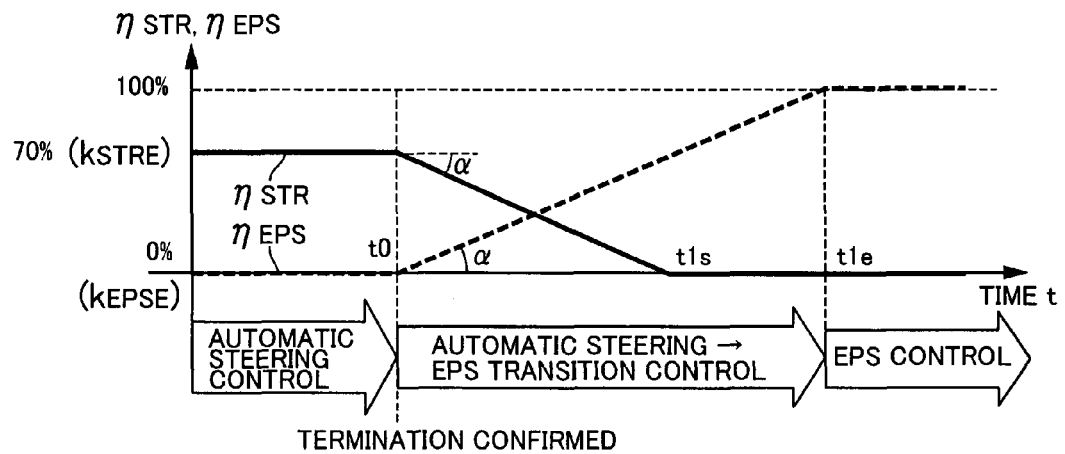
FIGS. 9A to 9C are graphs explaining a second part of the operation shifting from the automatic steering control to the power steering control.
Figure 9B:
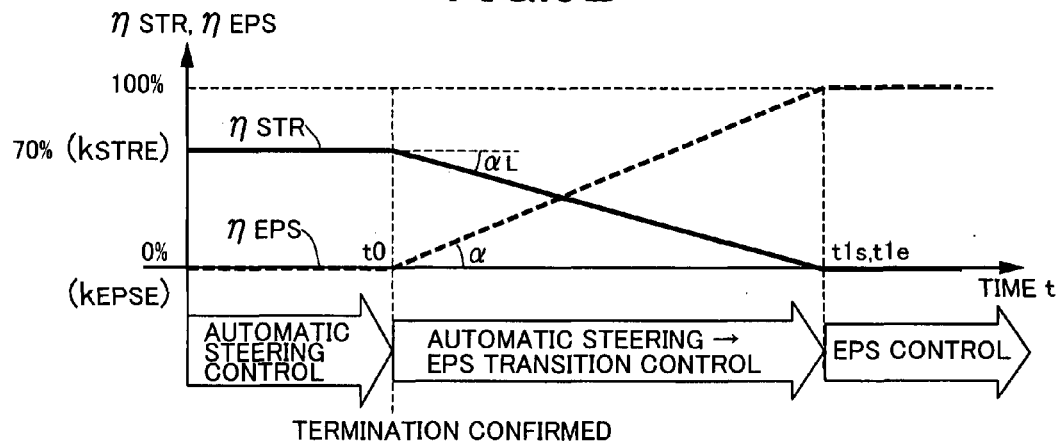
Figure 9C:
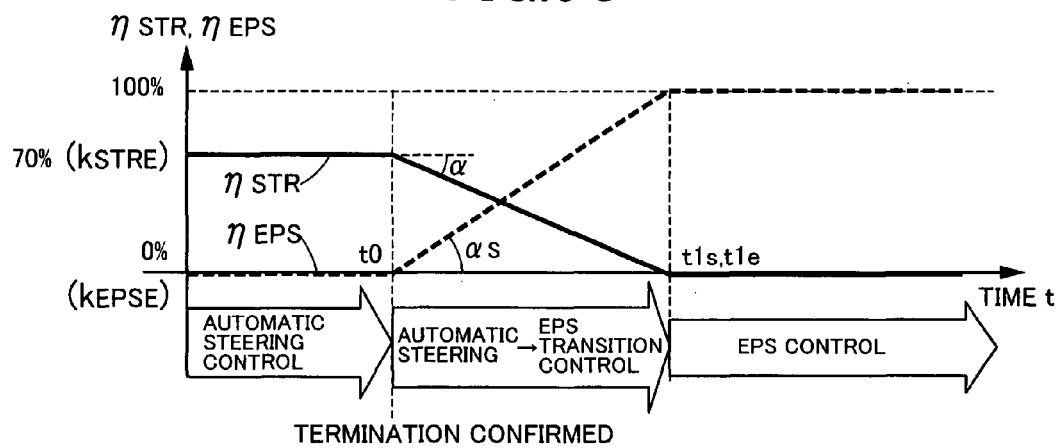

The time charts in FIGS. 9A-9C show operations in the switching transition period in the case where the maps of first correction coefficient $k_{STR}$ and the second correction coefficient $k_{EPS}$ are not vertically symmetrical. Specifically, this case corresponds to the case in the region of the first threshold value $T_{S1}$ to the third threshold value $T_{S3}$ in FIGS. 6A, 6C and 7B, that is, the case where the first time coefficient $\eta_{STR}$ is 70% and the second time coefficient $\eta_{EPS}$ is 0%.

In an example in FIG. 9A, when termination of the automatic steering control is confirmed, the first time coefficient $\eta_{STR}$ is decreased from 70% at the change rate α to 0% at the time t1s. On the other hand, the second time coefficient $\eta_{EPS}$ is increased from 0% at the change rate α to 100% at the time t1e. In this case, the switching transition period ends at the time t1e, which is the later time of the time t1s and the time t1e, and the control is shifted to the power steering control.

In an example in FIG. 9B, in order that the time t1s, when the first time coefficient $\eta_{STR}$ reaches 0%, coincides with the time t1e, when the second time coefficient $\eta_{EPS}$ reaches 100%, the change rate α at which the first time coefficient $\eta_{STR}$ decreases is decreased to αL, thereby delaying the time t1s to the time t1e. With this arrangement, the transition to the power steering control is further smoothened.

In an example in FIG. 9C, in order that the time t1s, when the first time coefficient $\eta_{STR}$ reaches 0%, coincides with the time t1e, when the second time coefficient $\eta_{EPS}$ reaches 100%, the change rate α at which the second time coefficient $\eta_{EPS}$ increases is increased to αS, thereby moving forward the time t1e up to the time t1s. With this arrangement, the shift to the power steering control is performed in a shorter amount of time.

Next, a second embodiment of the present invention will be described with reference to FIG. 10.

In the first embodiment, the corrected automatic steering control electric current $k_{STR}\cdot I_{STR}$ is obtained by multiplying the first correction coefficient $k_{STR}$ by the automatic steering control electric current $I_{STR}$; the corrected power steering control electric current $k_{EPS}\cdot I_{EPS}$ is obtained by multiplying the second correction coefficient $k_{EPS}$ by the power steering control electric current $I_{EPS}$; and the automatic steering control electric current $I_{STR}$ is obtained by adding the corrected automatic steering control electric current $k_{STR}\cdot I_{STR}$ and the corrected power steering control electric current $k_{EPS}\cdot I_{EPS}$.

On the other hand, in the second embodiment, if the direction of the steering torque Ts is different from the direction of the automatic steering control electric current $I_{STR}$, that is, if the driver operates the steering wheel 1 in a direction against the automatic steering control, the same control as in the first embodiment is performed. However, if the direction of the steering torque Ts is the same as the direction of the automatic steering control electric current $I_{STR}$, that is, if the driver operates the steering wheel 1 in a direction that is not against the automatic steering control, the automatic steering control electric current $I_{STR}$, before being multiplied by the first correction coefficient $k_{STR}$, is added to the corrected power steering control electric current $k_{EPS}\cdot I_{EPS}$ to obtain the automatic steering control electric current $I_{STR}$.

As can be observed from the first correction coefficient search map $MAP_{STR}$ in FIG. 5A, the first correction coefficient $k_{STR}$ decreases from 100% with the increase of the absolute value of the steering torque Ts. Therefore, the corrected automatic steering control electric current $k_{STR}\cdot I_{STR}$ obtained by being multiplied with the first correction coefficient $k_{STR}$ is decreased as compared with the automatic steering control electric current $I_{STR}$ before the correction, and correspondingly, the actuator driving current $I_{CONT}$ in the same direction as that of the steering torque Ts applied by the driver to the steering wheel 1 is also decreased. As a result, the driver may sense that operation of the steering wheel 1 becomes difficult or heavy.

Then, in the second embodiment, the automatic steering control electric current $I_{STR}$, before being multiplied with the first correction coefficient $k_{STR}$, is maintained as it is, thereby preventing the actuator driving current $I_{CONT}$ from decreasing in order to eliminate an uncomfortable feeling being sensed by or transmitted to the driver.

The embodiments of the present invention have been described above, but various changes in design can be made to the present invention without departing from the subject matter thereof.

For example, in the embodiments, the moving locus of the vehicle V to the target position (3) is stored beforehand in the memory section 23, but the moving locus can be calculated from the current position and the target position (3) of the vehicle V.

Also, in the embodiments, the first correction coefficient $k_{STR}$ and the second correction coefficient $k_{EPS}$ are map-searched with the steering torque Ts as a parameter, but they can be calculated as functions of the steering torque Ts instead of performing a map-search.

What is claimed is:

1. An automatic steering device for a vehicle, comprising:
a steering actuator for turning a wheel of a vehicle;
moving locus setter for storing or calculating a moving locus of the vehicle to a target position; and
steering actuator controller for calculating a first driving command value based on the moving locus, and calculating a second driving command value based on a steering force applied by a driver to a steering wheel,
wherein the steering actuator controller drives the steering actuator using a control amount computed using the first driving command value and the second driving command value in a predetermined ratio, and sets the predetermined ratio corresponding to the steering force.

2. The automatic steering device for a vehicle according to claim 1, wherein the steering actuator controller sets the predetermined ratio such that a proportion of the first driving command value decreases when the steering force increases.

3. The automatic steering device for a vehicle according to claim 2, wherein the steering actuator controller maintains a proportion of the first driving command value when a direction of the steering force is the same as a direction of the first driving command value.

4. The automatic steering device for a vehicle according to claim 3, wherein when termination of the automatic steering control is confirmed, the steering actuator controller sets the predetermined ratio at a time of confirmation as an initial value, decreases a proportion of the first driving command value and increases a proportion of the second driving command value according to an elapsed time from the time of confirmation.

5. The automatic steering device for a vehicle according to claim 2, wherein when termination of the automatic steering control is confirmed, the steering actuator controller sets the predetermined ratio at a time of confirmation as an initial value, decreases a proportion of the first driving command value and increases a proportion of the second driving command value according to an elapsed time from the time of confirmation.

6. The automatic steering device for a vehicle according to claim 1, wherein the steering actuator controller sets the predetermined ratio such that the second driving command value increases when the steering force increases.

7. The automatic steering device for a vehicle according to claim 6, wherein when termination of the automatic steering control is confirmed, the steering actuator controller sets the predetermined ratio at a time of confirmation as an initial value, decreases a proportion of the first driving command value and increases a proportion of the second driving command value according to an elapsed time from the time of confirmation.

8. The automatic steering device for a vehicle according to claim 1, wherein when termination of the automatic steering control is confirmed, the steering actuator controller sets the predetermined ratio at a time of confirmation as an initial value, decreases a proportion of the first driving command value and increases a proportion of the second driving command value according to an elapsed time from the time of confirmation.

* * * * *